US012744794B2

(12) United States Patent
Gallagher, Jr. et al.

(10) Patent No.: US 12,744,794 B2
(45) Date of Patent: Sep. 22, 2026

(54) SYSTEM AND METHOD FOR GENERATING A UNIFIED NETWORK TOPOLOGY FOR INCIDENT DETECTION AND RESPONSE

(71) Applicant: BigPanda, Inc., Redwood City, CA (US)

(72) Inventors: Frank A. Gallagher, Jr., Boulder City, NV (US); Orr Ganani, Kiryat Ono (IL)

(73) Assignee: BigPanda, Inc., Redwood City, CA (US)

(*) Notice: Subject to any disclaimer, the term of this patent is extended or adjusted under 35 U.S.C. 154(b) by 0 days.

(21) Appl. No.: 18/742,688

(22) Filed: Jun. 13, 2024

(65) Prior Publication Data

US 2025/0385924 A1 Dec. 18, 2025

(51) Int. Cl.
*H04L 9/40* (2022.01)
*H04L 12/70* (2013.01)

(52) U.S. Cl.
CPC .. *H04L 63/1416* (2013.01); *H04L 2012/5623* (2013.01)

(58) Field of Classification Search
CPC .................... H04L 63/1416; H04L 2012/5623
See application file for complete search history.

(56) References Cited

U.S. PATENT DOCUMENTS 10,693,711 B1 6/2020 Garg et al.
10,747,569 B2 8/2020 Avery et al.
10,798,113 B2 10/2020 Muddu et al.
11,132,373 B1* 9/2021 Timko ................ G06F 16/9038
11,258,807 B2 2/2022 Muddu et al.
11,611,466 B1 3/2023 Arzani et al.
2013/0091283 A1 4/2013 Omar
2016/0210310 A1 7/2016 Nogueira Dos Santos et al.
2019/0260807 A1 8/2019 Joul
2021/0279824 A1 9/2021 Choi et al.
2022/0045898 A1* 2/2022 A ........................ H04L 41/0631
2023/0032585 A1 2/2023 Jeuk et al.
2023/0370334 A1 11/2023 Mannengal et al.
2023/0370452 A1 11/2023 Mannengal et al.
2025/0238302 A1 7/2025 Paulraj et al.

OTHER PUBLICATIONS

Wikipedia Contributors. “Network topology.” Wikipedia, The Free Encyclopedia. Wikipedia, The Free Encyclopedia, Nov. 26, 2025. Web. Dec. 17, 2025.

* cited by examiner

*Primary Examiner* — Azizul Choudhury
(74) *Attorney, Agent, or Firm* — M&B IP Analysts, LLC

(57) ABSTRACT

A system and method for generating a unified network topology for a computing environment is presented. The method includes: receiving a plurality of event records, each event record generated based on an event in the computing environment; extracting from each event record of the plurality of event records network topology information; detecting in the extracted network topology information a parent resource and a child resource; generating a representation of the parent resource in a unified network topology; generating a representation of the child resource in the unified network topology; and connecting the representation of the parent resource to the representation of the child resource, wherein the connection represents the extracted topology information.

21 Claims, 7 Drawing Sheets

SYSTEM AND METHOD FOR GENERATING A UNIFIED NETWORK TOPOLOGY FOR INCIDENT DETECTION AND RESPONSE

TECHNICAL FIELD

The present disclosure relates generally to incident detection and response, and specifically for generating a unified network topology to detect incidents and initiate responses to the detected incidents.

BACKGROUND

Incident response in cloud computing involves the coordinated effort to detect, assess, and mitigate security breaches or disruptions within cloud-based systems. This process is crucial for maintaining the integrity and security of data and services hosted in the cloud. However, a persistent challenge with current approaches to incident response in cloud computing lies in the complexity and dynamic nature of cloud environments.

Traditional incident response strategies often struggle to adapt to the scalability and agility of cloud infrastructures. Cloud environments are characterized by their elastic nature, with resources dynamically provisioned and de-provisioned in response to demand. This rapid and automated provisioning can make it difficult for security teams to maintain visibility and control over the entire cloud ecosystem. Consequently, incidents may go unnoticed or undetected until significant damage has occurred.

Moreover, the distributed nature of cloud computing exacerbates the challenge of incident response. Cloud services are often spread across multiple geographic regions and data centers, making it challenging to centralize monitoring and response efforts. Coordinating incident response activities across disparate cloud environments can lead to delays in detection and response, increasing the potential impact of security incidents.

Another issue is the reliance on traditional security tools and methodologies that are ill-suited for cloud environments. Legacy security solutions designed for on-premises infrastructure may not provide adequate visibility or protection in cloud environments. Additionally, the shared responsibility model of cloud computing means that both cloud providers and customers are responsible for different aspects of security, further complicating incident response efforts.

To address these challenges, organizations need to adopt cloud-native security solutions and practices tailored to the unique characteristics of cloud environments. This includes leveraging automation, artificial intelligence, and machine learning technologies to enhance threat detection and response capabilities. Additionally, implementing comprehensive monitoring and logging mechanisms across all cloud services and workloads can improve visibility and enable faster incident response. Overall, evolving incident response strategies to align with the realities of cloud computing is essential for effectively mitigating security risks and safeguarding cloud-based assets.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include receiving a plurality of event records, each event record generated based on an event in the computing environment. Method may also include extracting from each event record of the plurality of event records network topology information. Method may furthermore include detecting in the extracted network topology information a parent resource and a child resource. Method may in addition include generating a representation of the parent resource in an unified network topology. Method may moreover include generating a representation of the child resource in the unified network topology. Method may also include connecting the representation of the parent resource to the representation of the child resource, where the connection represents the extracted topology information. Other embodiments of this aspect include corresponding computer systems, apparatus, and computer programs recorded on one or more computer storage devices, each configured to perform the actions of the methods.

Implementations may include one or more of the following features. Method may include: extracting topology information including any one of: an identifier of a resource, a relationship between a first resource and a second resource, geographical information, spatial information, and any combination thereof. Method may include: determining that a first event record of the plurality of event records is received from a first source having a first schema; and parsing the first event record based on the first schema. Method may include: determining that a second event record of the plurality of event records is received from a second source having a second schema; and parsing the second event record based on the second schema, where the second schema is different from the first schema. Method may include: mapping the first schema to a data schema of the unified network topology; and mapping the second schema to the data schema of the unified network topology. Method may include: evicting a representation of a resource from the unified network topology in response to determining that no event was received respective of the resource for a predetermined amount of time. Method may include: evicting a representation of another resource in response to determining that the resource is a parent of the another resource. Method may include: storing the unified network topology in any one of: a table database, a graph database, and a combination thereof. Method may include: detecting in the extracted topology information an identifier of a principal associated with the parent resource; and storing the identifier of the principal with the representation of the parent resource.

Method may include: associating the representation of the parent resource and the representation of the child resource with the identifier of the principal. Implementations of the described techniques may include hardware, a method or process, or a computer tangible medium.

In one general aspect, non-transitory computer-readable medium may include one or more instructions that, when executed by one or more processors of a device, cause the device to: receive a plurality of event records, each event record generated based on an event in the computing environment; extract from each event record of the plurality of event records network topology information; detect in the extracted network topology information a parent resource and a child resource; generate a representation of the parent resource in an unified network topology; generate a representation of the child resource in the unified network topology; and connect the representation of the parent resource to the representation of the child resource, where the connection represents the extracted topology information. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: receive a plurality of event records, each event record generated based on an event in the computing environment. System may in addition extract from each event record of the plurality of event records network topology information. System may moreover detect in the extracted network topology information a parent resource and a child resource. System may also generate a representation of the parent resource in an unified network topology. System may furthermore generate a representation of the child resource in the unified network topology. System may in addition connect the representation of the parent resource to the representation of the child resource, where the connection represents the extracted topology information. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: extract topology information including any one of: an identifier of a resource, a relationship between a first resource and a second resource, geographical information, spatial information, and any combination thereof. System where the memory contains further instructions which when executed by the processing circuitry further configure the system to: determine that a first event record of the plurality of event records is received from a first source having a first schema; and parse the first event record based on the first schema. System where the memory contains further instructions which when executed by the processing circuitry further configure the system to: determine that a second event record of the plurality of event records is received from a second source having a second schema; and parse the second event record based on the second schema, where the second schema is different from the first schema. System where the memory contains further instructions which when executed by the processing circuitry further configure the system to: map the first schema to a data schema of the unified network topology; and map the second schema to the data schema of the unified network topology. System where the memory contains further instructions which when executed by the processing circuitry further configure the system to: evict a representation of a resource from the unified network topology in response to determining that no event was received respective of the resource for a predetermined amount of time. System where the memory contains further instructions which when executed by the processing circuitry further configure the system to: evict a representation of another resource in response to determining that the resource is a parent of the another resource. System where the memory contains further instructions which when executed by the processing circuitry further configure the system to: store the unified network topology in any one of: a table database, a graph database, and a combination thereof. System where the memory contains further instructions which when executed by the processing circuitry further configure the system to: detect in the extracted topology information an identifier of a principal associated with the parent resource; and store the identifier of the principal with the representation of the parent resource. System where the memory contains further instructions which when executed by the processing circuitry further configure the system to: associate the representation of the parent resource and the representation of the child resource with the identifier of the principal. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
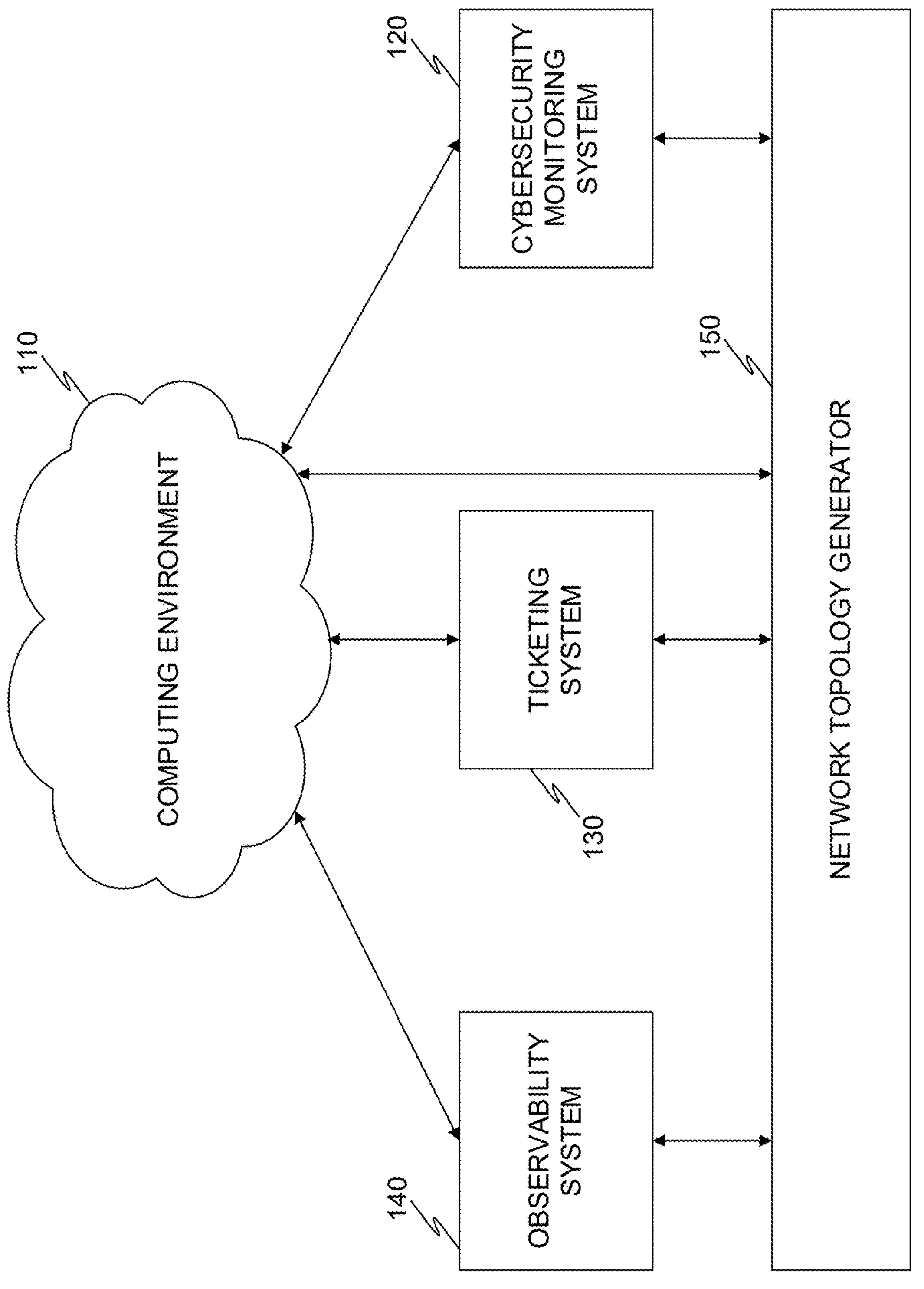
FIG. 1 is an example of a computing environment and a network topology generator, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example of a computing environment and a network topology generator, utilized to describe an embodiment. According to an embodiment, a computing environment 110 is a networked computing environment. In some embodiments, the computing environment 110 is an on-prem environment, a cloud computing environment, a hybrid computing environment, a combination thereof, and the like.

In certain embodiments, a cloud computing environment includes a virtual private network (VPN), a virtual private cloud (VPC), a virtual network (VNet), a combination thereof, and the like.

In an embodiment, a cloud computing environment is deployed on a cloud computing infrastructure. For example, according to an embodiment, a cloud computing infrastructure is Amazon® Web Services (AWS), Google® Cloud Platform (GCP), Microsoft® Azure, and the like.

In some embodiments, the computing environment 110 includes a plurality of resources and principals, not shown here for simplicity. In an embodiment, a resource is a physical resource, a virtual resource, a combination thereof, and the like. For example, in an embodiment, a resource is a hardware component, such as a processor, a storage device, a memory, a hardware accelerator, a combination thereof, and the like. In some embodiments, a resource is a virtual machine, a software container, a serverless function, various combinations thereof, and the like.

In an embodiment, the computing environment 110 includes a principal. In some embodiments, a principal is an entity deployed in the computing environment 110 which is authorized to initiate actions in the computing environment 110, access resources, alter resources, deploy resources, a combination thereof, and the like. A principal is, according to an embodiment, a user account, a service account, a role, a user group, a combination thereof, and the like.

In an embodiment, the computing environment 110 is connected to a plurality of third party systems, such as a cybersecurity monitoring system 120, a ticketing system 140, and an observability system 140. In certain embodiments, a cybersecurity monitoring system 120 is configured to monitor the computing environment 110, elements thereof, resources thereof, and the like, for cybersecurity attacks.

In some embodiments, each component, entity, and the like, generates events. For example, in an embodiment, an action in the computing environment 110 causes generation of an event record, for example stored as a data record in a log, such as a computing log, a network log, an event log, and the like.

In certain embodiments, a resource of the computing environment 110, such as a serverless function, is configured to detect events occurring in the computing environment 110, such as generation of a new principal, communication between resources, communication between principals, a combination thereof, etc., and generate an event record based on such detection. In some embodiments, the event record is written to a cloud log as a data record, for example, an event record is stored utilizing CloudTrail.

In an embodiment, the computing environment 110 includes a virtual network topology. In some embodiments, a network topology includes the virtual resources, physical resources, connections thereof, and the like. For example, in an embodiment, a network topology includes a data schema utilized to store a representation of a networked computing environment, including a representation of each entity (e.g., resource, principal, etc.), connections between them, data flows, and the like.

According to some embodiments, the computing environment 110 is connected to a ticketing system 130. In an embodiment, the ticketing system 130 is configured to generate support tickets based on events in the computing environment 110. In certain embodiments, the ticketing system 130 is further configured to assign support tickets to users (e.g., principals), of the computing environment 110, an external computing environment (not shown), a combination thereof, and the like.

In an embodiment, the ticketing system 130 includes a representation of the computing environment 110. For example, in an embodiment, a ticketing system 130 is configured to generate a support ticket based on an event which includes an identifier of a resource, and an identifier of a secondary resource. In an embodiment, a host server is a resource, and a processor thereof is a secondary resource.

In some embodiments, the computing environment 110 is further connected to an observability system 140. In an embodiment, the observability system 140 is configured to: perform a network scan, perform packet scanning, perform deep packet inspection, detect changes in the computing environment 110, read an event log of the computing environment 110, a combination thereof, and the like.

In an embodiment, the observability system 140 further includes a representation of the computing environment 110. For example, in an embodiment, the observability system 140 includes a data schema utilized to represent entities of the computing environment 110, entities connected to the computing environment 110, a combination thereof, and the like.

In certain embodiments, a network topology generator 150 (also referred to simply as 'generator 150') is configured to generate a representation of a network topology. In an embodiment, the generator 150 is configured to generate a representation of the network topology of the computing environment 110. According to an embodiment, the generator 150 is configured to receive, request, etc., data from the observability system 140, the ticketing system 130, the cybersecurity monitoring system 120, the computing environment 110, a combination thereof, and the like.

According to some embodiments, the generator 150 is configured to utilize the data to generate a network topology based on a unified network schema. In an embodiment, utilizing a unified network schema is advantageous as each system connected to the computing environment 110 is configured to utilize a different schema to represent the computing environment 110, a portion of the computing environment 110 (e.g., only principals, for example an identity and access management service), a combination thereof, and the like.

For example, in some embodiments, utilizing a unified network topology generated from multiple data sources (e.g., the observability system 140, cybersecurity monitoring system 120, etc.) allows associating events into incidents. In some embodiments, a plurality of events, occurring within a timeframe, indicate an incident. For example, in an embodiment, a processor failure, an unresponsive host machine, and an unresponsive database, are all events which are related to the same incident, whereby a database application hosted on the host machine is unresponsive due to a processor failure of the host machine.

In an embodiment, a unified network topology is stored in a storage, a memory, and the like, of the network topology generator 150. In certain embodiment, the unified network topology is stored as a graph in a graph database, as a table in a table database, and the like.

Figure 2:
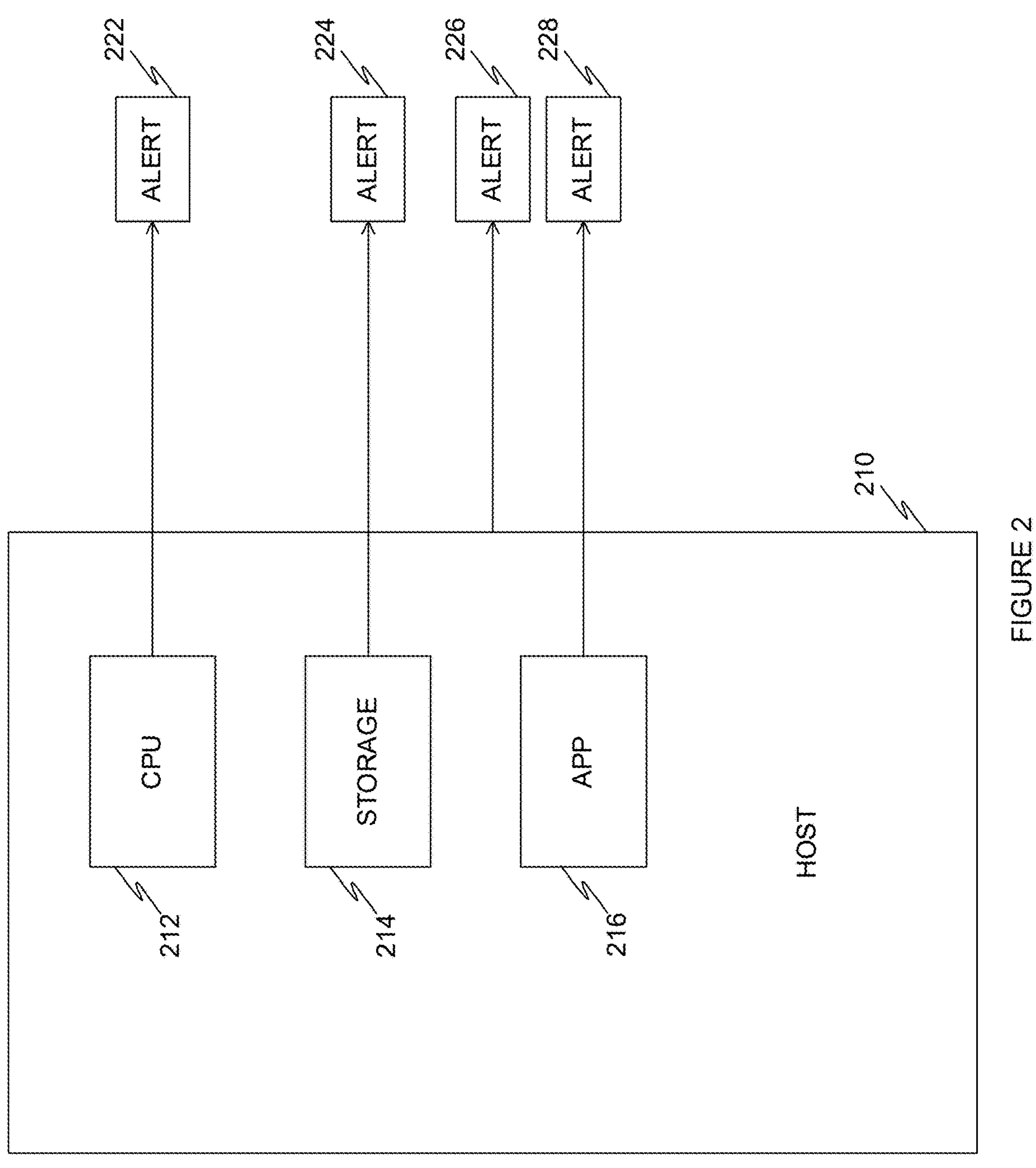
FIG. 2 is an example diagram of a resource deployed in a computing environment, implemented in accordance with an embodiment.

FIG. 2 is an example diagram of a resource deployed in a computing environment, implemented in accordance with an embodiment. In an embodiment, the resource is a virtual resource, such as a virtual machine. In certain embodiments, a virtual machine is implemented, for example, utilizing Oracle® VirtualBox.

In an embodiment, the host 210 is a virtual resource deployed in a computing environment, such as the computing environment 110 of FIG. 1. In some embodiments, the host 210 includes a network interface, through which the host 210 is configured to communicate with a networked environment, for example to other hosts.

In certain embodiments, the host 210 includes a processing circuitry, such as CPU 212, a storage device, such as storage 214, and an application 216 which is executed on the host 210 utilizing the components (e.g., the CPU 212, storage 214, etc.) thereof. In an embodiment, the application 216 is a web server, a proxy server, a gateway, a web application firewall (WAF), a load balancer, a combination thereof, and the like. For example, in an embodiment, the application 216 is an instance of Nginx®.

In an embodiment, each component of the host 210, including the host 210 itself, can generate events in the computing environment in which the host 210 is deployed. For example, in an embodiment, the CPU 212 causes an event which generates alert 222. In some embodiments, the storage 214 causes an event which generates alert 224, for example the event is a disk failure. In certain embodiments the application causes an event, such as initiating a network connection, responding to an ack request, accessing a resource, etc., which generates alert 228.

According to certain embodiments, an alert 226 is generated in response to an action initiated by the host 210. For example, in an embodiment, the alert 226 is generated in response to the host 210 not responding to a PING request to an address associated with the host.

Figure 3:
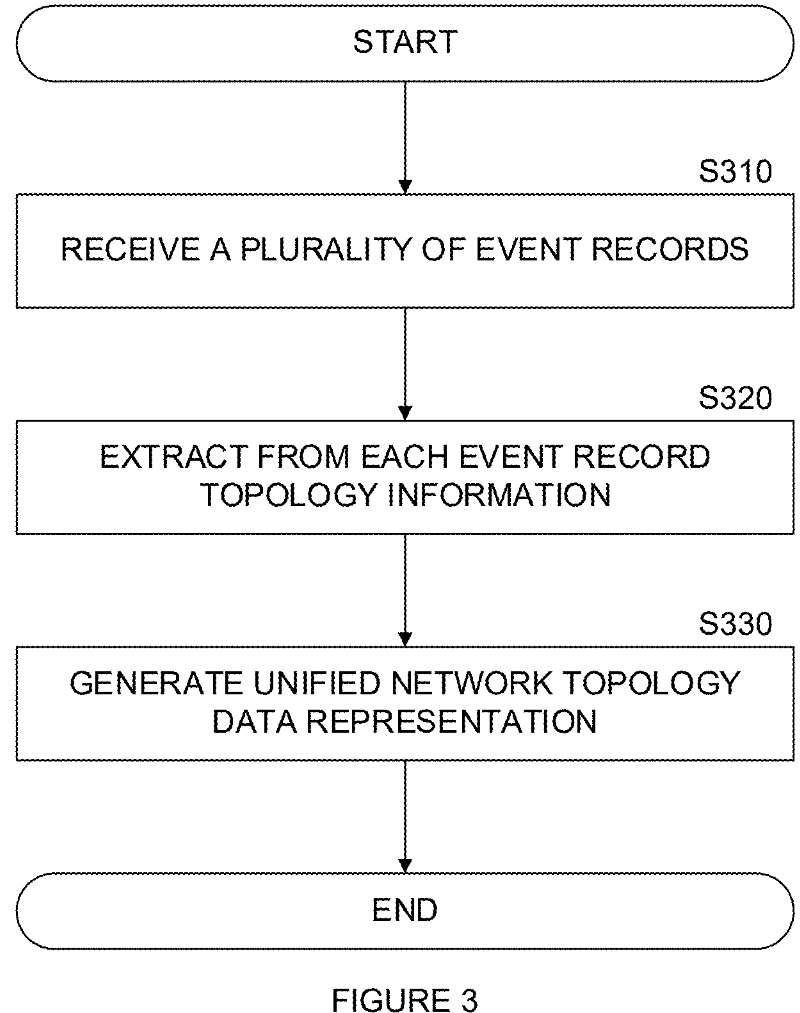
FIG. 3 is an example flowchart of a method for generating a unified network topology from a plurality of sources, implemented in accordance with an embodiment.

FIG. 3 is an example flowchart of a method for generating a unified network topology from a plurality of sources, implemented in accordance with an embodiment. According to an embodiment, generating a unified network topology from a plurality of sources is beneficial, as this allows, for example, to correlate different events into a single incident, allows to perform root cause analysis, and allows to detect potential impact of events prior to formation of an incident.

At S310, a plurality of events records is received. In an embodiment, an event record is a data record, including an identifier of a resource, a status of a resource, an identifier of a principal, a network address, a MAC address, a resource type, a time stamp, a combination thereof, and the like.

In an embodiment, a fist plurality of event records is received from a first source, and a second plurality of event records is received from a second source. According to some embodiments, the first source is connected to a computing environment, such as the computing environment 110 of FIG. 1 above. In certain embodiments, the second source is connected to the computing environment.

In some embodiments, a source is a cybersecurity monitoring solution (e.g., Snyk®), a ticketing system (e.g., Jira®), an observability system (e.g., service dependency diagram generator, ServiceNow®, etc.), a combination thereof, and the like.

In certain embodiments, each source includes a schema which is utilized for generating event records. In an embodiment, a first source and a second source each utilize a unique schema. In some embodiments, it is therefore advantageous to utilize a unified network topology schema to unify event records from a plurality of sources.

At S320, topology information is extracted. In an embodiment, topology information is extracted from each event record. In some embodiments, topology information includes identifiers of a plurality of resources, information related to a plurality of resources, a combination thereof, and the like.

For example, in an embodiment, a first event record indicates a first resource, which is a component of a second resource. In some embodiments, the first resource is a storage, and the second resource is a host server utilizing the storage. In an embodiment, the event record includes topology information, such as parent-child relationship. In the example presented above, the second resource is a parent of the first resource. In certain embodiments, the topology information is extracted from a schema of the source.

In an embodiment, the topology information includes physical spatial information, such as geographical information, virtual spatial information, and the like. For example, in an embodiment, virtual spatial information is AWS East, AWS West, and the like. As another example, in an embodiment, virtual spatial information is an identifier of a virtual private cloud, a virtual network (VNet), and the like.

At S330, a unified network topology is generated. In an embodiment, the unified network topology is a data representation of the network topology. In some embodiments, the unified network topology is generated based on the extracted topology information. For example, in an embodiment, a plurality of data schemas, each data schema associated with a source of event records, is mapped to a unified network topology.

In certain embodiments, the unified network topology includes parent-child information, identifiers of resources, related events, spatial information, a combination thereof, and the like.

In an embodiment, the unified network topology is stored as a data representation in a database, such as a graph database, a table database, a combination thereof, and the like. In some embodiments, a graph database is implemented utilizing Node4j®.

In an embodiment, a network topology generator is configured to generate the unified network topology. According to an embodiment, the network topology generator further includes an eviction policy. For example, in some embodiments, where an event has not been received for a certain resource for a period of time over a threshold value, a representation of the resource is removed (i.e., evicted) from the network topology.

In some embodiments, the eviction policy is applied only to parent type representations. For example, in an embodiment, the eviction policy is applied to the host, but not to the storage associated with the host. Thus, where the storage has not generated an alert for a period of time exceeding the threshold value, a representation of the storage is not evicted. In an embodiment, when a parent type representation (e.g., of the host) is evicted, all representations of children of the parent are evicted from the network topology representation.

Figure 4:
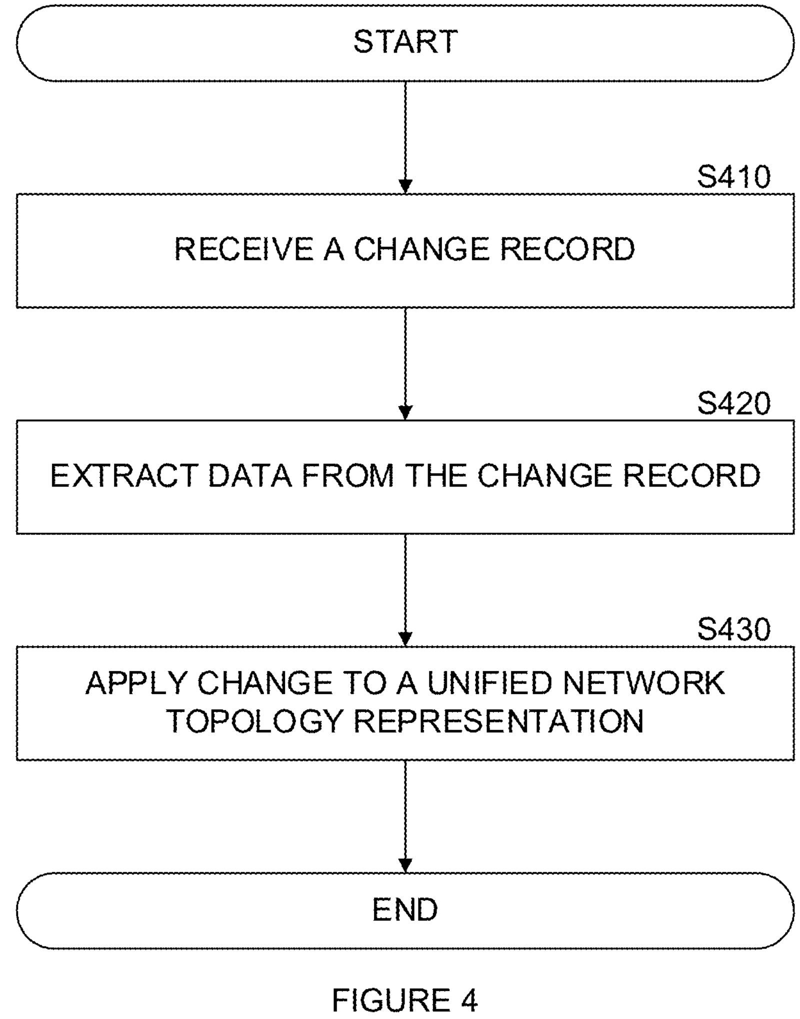
FIG. 4 is an example flowchart of a method for updating a unified network topology representation, implemented in accordance with an embodiment.

FIG. 4 is an example flowchart of a method for updating a unified network topology representation, implemented in accordance with an embodiment. In an embodiment, a unified network topology representation is generated which represents a network topology of a computing environments, of multiple computing environments of a single organizations, and the like.

At S410, a change record is received. In an embodiment, the change record indicates a resource and a status thereof. In certain embodiments, a change record indicates a change in a resource, in a principal, in a combination of a resource and a principal, in a resource and a resource, etc., and the like.

In an embodiment, a change record is an event record of a resource, a principal, a combination thereof, and the like, which is previously represented in the unified network topology. In certain embodiments, the change records includes a status such as 'active', 'inactive', 'online', 'offline', etc.

At S420, data is extracted from the change record. In an embodiment, extracted data includes an identifier of a resource, an identifier of a principal, a value of a status of a resource, a combination thereof, and the like. In certain embodiments, a change record is a change with respect to a principal. For example, in an embodiment, a change record indicates For example, in an embodiment, a first event record indicates a first resource, which is a component of a second resource. In some embodiments, the first resource is a storage, and the second resource is a host server utilizing the storage. In an embodiment, the event record includes topology information, such as parent-child relationship. In the example presented above, the second resource is a parent of the first resource. In certain embodiments, the topology information is extracted from a schema of the source.

In an embodiment, the topology information includes physical spatial information, such as geographical information, virtual spatial information, and the like. For example, in an embodiment, virtual spatial information is AWS East, AWS West, and the like. As another example, in an embodiment, virtual spatial information is an identifier of a virtual private cloud, a virtual network (VNet), and the like.

At S430, a change is applied to a unified network topology representation. In an embodiment, a check is performed to determine if the change record includes data which is not stored on the unified network topology representation. In some embodiments, a value corresponding to a data field in a change record contradicts a value stored in the unified network topology representation.

For example, in an embodiment, a data field is an identifier of an application version, and the value is a specific version number (e.g., version 1.0). In some embodiments, the unified network topology representation indicates that a resource includes an application having a version 1.0, while the change record indicates that the resource includes an application having a version 1.5.

In certain embodiments, a source credibility score is assigned to a source from which each change record is received. For example, in an embodiment, a first source has a credibility score which is higher (i.e., more credible) than a second source. In an embodiment, data from a change record is updated into the unified network topology representation only in response to the credibility score of the source exceeding a predetermined value.

In some embodiments, a plurality of data sources, each having a respective credibility score, both indicate a same change. In certain embodiments, a combined credibility score is determined based on each source, and a change is made to the unified network topology representation in response to determining that the combined credibility score is higher than a predetermined threshold value.

In an embodiment, a unique threshold value is assigned to each of a plurality of data fields. According to an embodiment, a change record is utilized to update the unified network topology in response to determining that the source of the change record has a credibility score which exceeds the unique threshold value of a data field. In some embodiments, a source has a credibility score which is enough to update certain data field values, but not enough to update other data field values.

Figure 5:
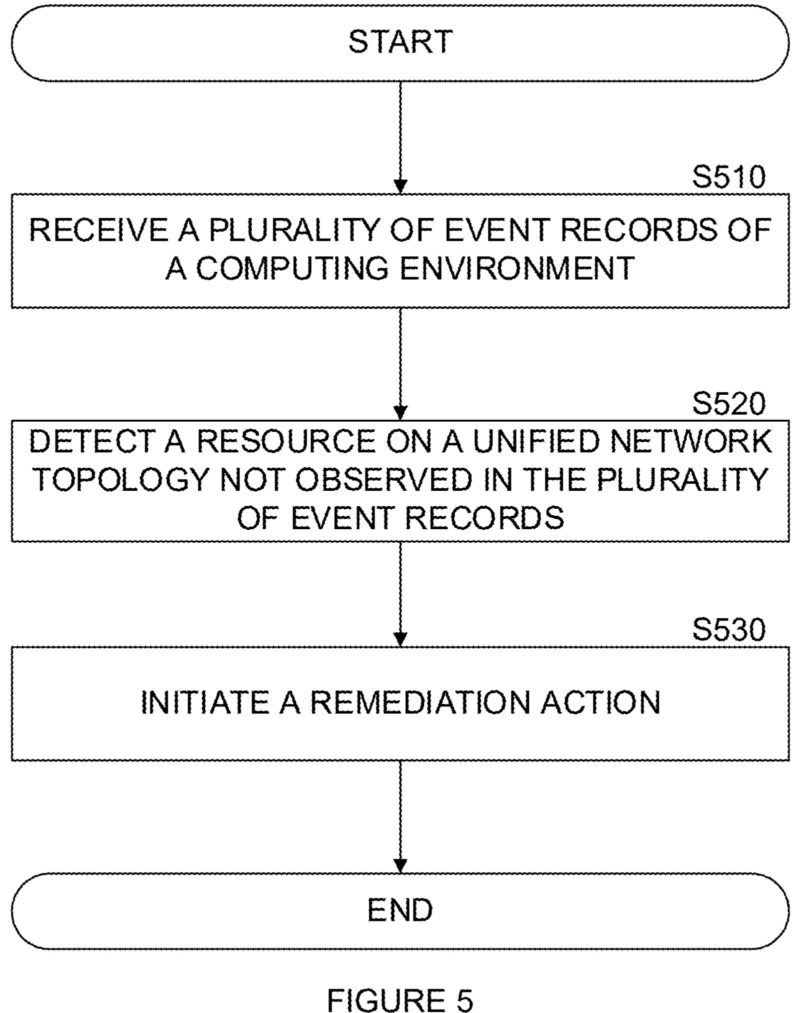
FIG. 5 is an example flowchart of a method for initiating a remediation action in a computing environment based on a unified network topology, implemented in accordance with an embodiment.

FIG. 5 is an example flowchart of a method for initiating a remediation action in a computing environment based on a unified network topology, implemented in accordance with an embodiment.

At S510, a plurality of event records are received. In an embodiment, a first group of event records are received from a first source, and a second group of event records are received from a second source.

In some embodiments, a source is a cybersecurity monitoring solution (e.g., Snyk®), a ticketing system (e.g., Jira®), an observability system (e.g., service dependency diagram generator, ServiceNow®, etc.), a combination thereof, and the like.

In certain embodiments, each source includes a schema which is utilized for generating event records. In an embodiment, a first source and a second source each utilize a unique schema.

In an embodiment, an event record is a data record, including an identifier of a resource, a status of a resource, an identifier of a principal, a network address, a MAC address, a resource type, a time stamp, a combination thereof, and the like.

At S520, a resource is detected. In some embodiments, the resource is detected in the unified network topology representation, and is not detected in the received events. For example, in an embodiment, a resource is not detected in any event received within a predetermined period of time.

In some embodiments, a network, computing environment, and the like, change over time. Resources are provisioned, deprovisioned, etc., and the unified network topology should be updated to reflect a current state of the network.

In an embodiment, a resource is detected in a received event record. According to some embodiments, detecting a resource includes detecting an identifier, a unique identifier, and the like, which indicate a resource deployed in the computing environment.

In certain embodiments, a principal is further detected. For example, in an embodiment, an event record indicates a principal initiated an action in a computing environment which caused a resource to be provisioned. In some embodiments, the resource is a virtual machine, and the principal is a user account which initiated provisioning the virtual machine.

In an embodiment, the detected resource is not represented in the unified network topology representation. In certain embodiments, an identifier of the resource is utilized in searching the unified network topology. For example, according to an embodiment, the unified network topology representation is stored as a graph in a graph database. In an embodiment, the graph database is queried with the identifier of the resource to determine if the identifier is detected in the graph.

At S530, a remediation action is initiated. In an embodiment, the remediation action is initiated in response to detecting a resource represented in the unified network topology for which an event record has not been received.

In some embodiments, the remediation action includes initiating an eviction policy action. For example, according to certain embodiments, the remediation action includes removing a resource from the unified network topology, for which an event record has not been received for a predefined amount of time (e.g., 7 days). In some embodiments, different entity types are evicted within different amounts of predefined time, i.e., there is a different time-based threshold for each entity type for eviction. In an embodiment, some entity types are not evicted.

For example, according to some embodiments, an entity type of an operating system is a type of resource which is not frequently changed, therefore, if no event records are received which indicate a certain version of an operating system, a representation of that operating system is not removed from the unified network topology.

Figure 6:
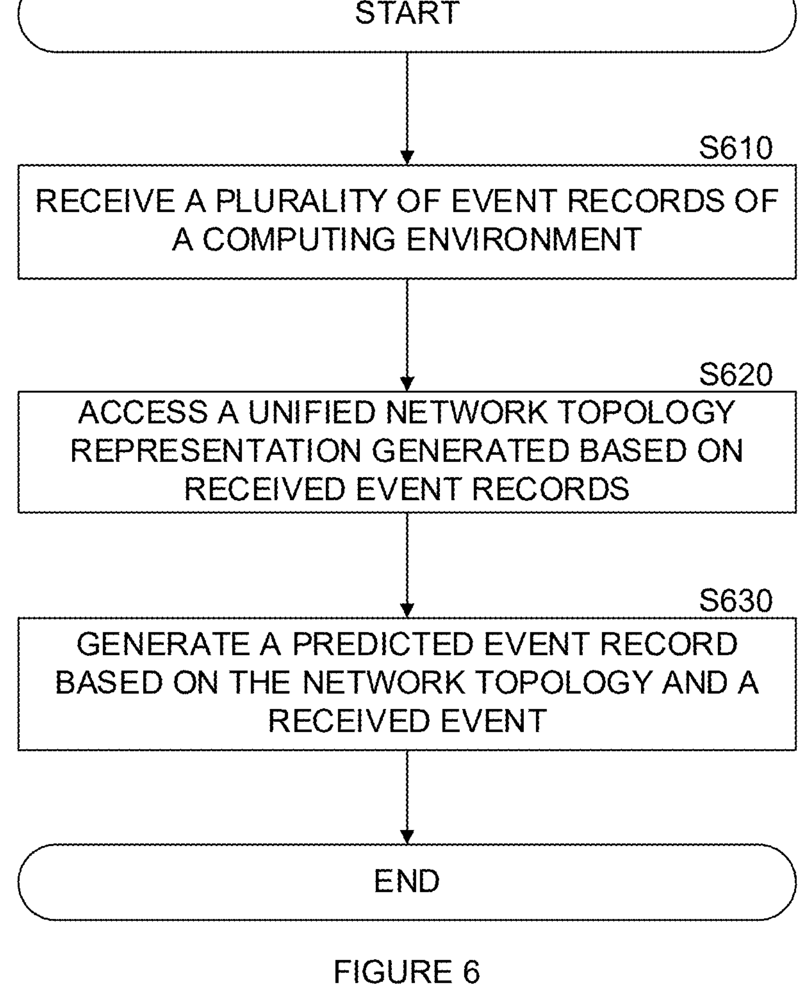
FIG. 6 is an example flowchart of a method for generating a predicted event record based on a unified network topology, implemented in accordance with an embodiment.

FIG. 6 is an example flowchart of a method for generating a predicted event record based on a unified network topology, implemented in accordance with an embodiment. According to certain embodiments, once a unified network topology is generated for a computing environment, an incident prediction is generated, based on the representation of the unified network topology.

At S610, a plurality of event records are received. In an embodiment, a first group of event records are received from a first source, and a second group of event records are received from a second source.

In some embodiments, a source is a cybersecurity monitoring solution (e.g., Snyk®), a ticketing system (e.g., Jira®), an observability system (e.g., service dependency diagram generator, ServiceNow®, etc.), a combination thereof, and the like.

In certain embodiments, each source includes a schema which is utilized for generating event records. In an embodiment, a first source and a second source each utilize a unique schema.

In an embodiment, an event record is a data record, including an identifier of a resource, a status of a resource, an identifier of a principal, a network address, a MAC address, a resource type, a time stamp, a combination thereof, and the like.

At S620, a unified network topology is accessed. In an embodiment, a unified network topology is stored as a representation in a security database. For example, in an embodiment, the security database is a graph database, such as Neo4j®, and the unified network topology is stored as a representation thereof.

In an embodiment, accessing a unified network topology includes querying a database, traversing a graph, etc., to generate a result. In some embodiments, the unified network topology is accessed based on data extracted from a plurality of event records. For example, in an embodiment, an identifier of a resource, an identifier of an identity, a combination thereof, and the like, are utilized to search a database storing the unified network topology for a representation of the resource, of the identifier, etc.

According to an embodiment, an event baseline is generated for a resource, a group of resources, a group of connected resources, a group of similar resources, a combination thereof, and the like, based on the accessed unified network topology.

In some embodiments, an event baseline is generated based on a statistical model, such as a seasonal autoregressive integrated moving average (SARIMA). In certain embodiments, the event baseline is generated based on a result of a prompt processed by a large language model (LLM) which is configured to generate a baseline based on the prompt, and a plurality of received event records.

At S630, an incident prediction is generated. In an embodiment, predicting an incident includes extracting data from a plurality of event records, and utilizing the extracted data in a prompt generated for processing by an LLM. In some embodiments, the extracted data is provided as a context to an LLM. In an embodiment, the prompt is generated based on a template, a predefined structure, and the like.

In an embodiment, predicting an incident is advantageous as it allows to initiate a remediation action for the incident prior to the incident occurring. For example, in an embodiment, an event record indicates a memory is beyond a capacity. In some embodiments, an incident prediction is generated based on the received event and a generated baseline for the memory, a generated baseline of the resource which utilizes the memory, etc.

In an embodiment, the prediction is generated based on a result of executing a prompt by an LLM. For example, according to an embodiment, an LLM is provided with a prompt to determine if a current received record and a baseline of a resource identified in the current received record results in an incident in the future.

In the example of the memory, when the memory is full, additional records cannot be written or processed, which causes an overflow, and can result in the resource (e.g., a server) becoming inoperative. By determining this early on, and preferably before such an incident occurs, it is possible to remediate the situation, for example by initiating a remediation action.

In an embodiment, the unified network topology is utilized to generate an incident based on a plurality of received data records. For example, according to an embodiment, event records are grouped together based on detecting events which occur on resources which are in proximity to each other based on the unified network topology. In an embodiment, a first resource is in proximity to another resource based on a number of 'hops' in a graph from a node representing the first resource to a node representing the second resource.

Figure 7:
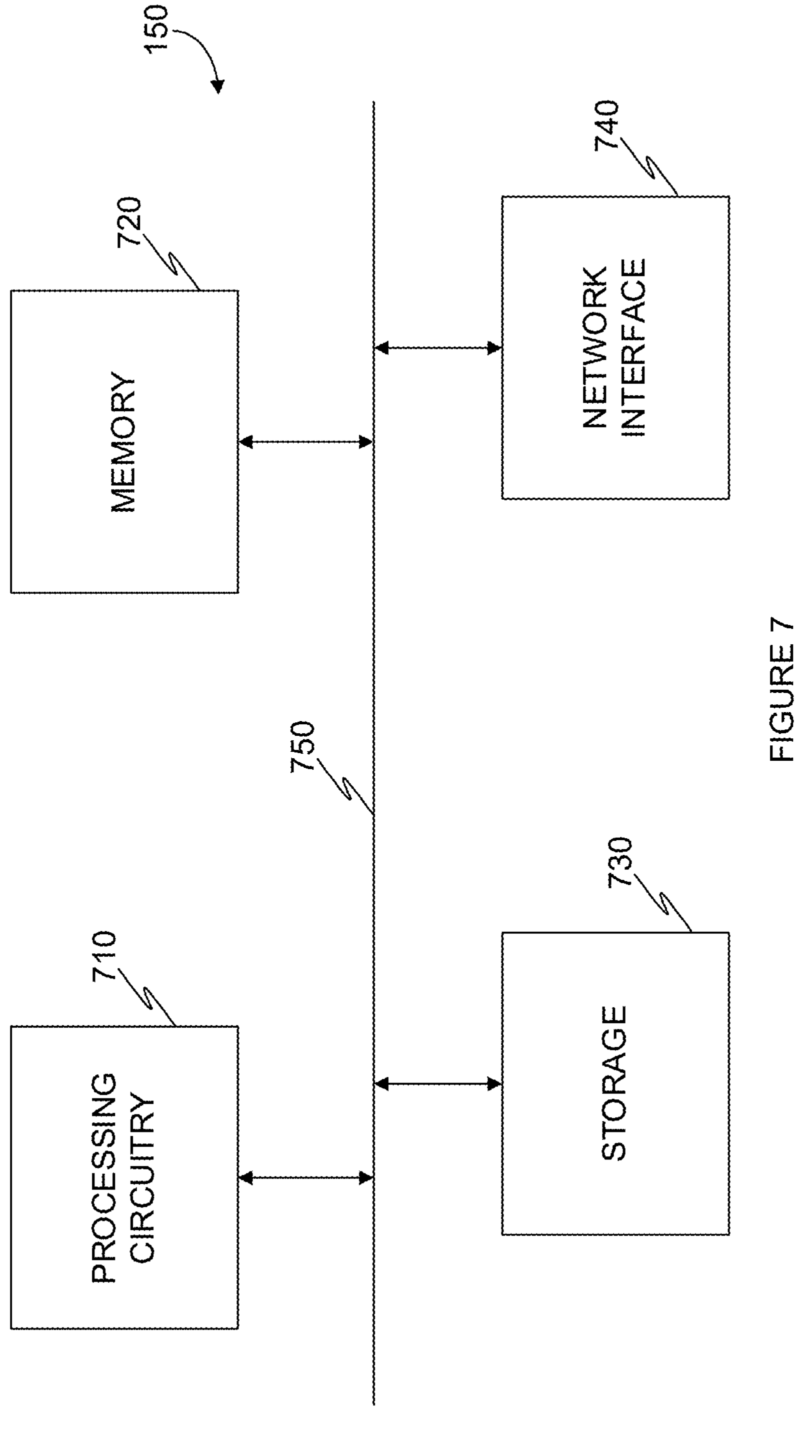
FIG. 7 is an example schematic diagram of a topology generator according to an embodiment.

FIG. 7 is an example schematic diagram of a topology generator 150 according to an embodiment. The topology generator 150 includes, according to an embodiment, a processing circuitry 710 coupled to a memory 720, a storage 730, and a network interface 740. In an embodiment, the components of the topology generator 150 are communicatively connected via a bus 750.

In certain embodiments, the processing circuitry 710 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 720 is a volatile memory (e.g., random access memory, etc.), a non-volatile memory (e.g., read only memory, flash memory, etc.), a combination thereof, and the like. In some embodiments, the memory 720 is an on-chip memory, an off-chip memory, a combination thereof, and the like. In certain embodiments, the memory 720 is a scratch-pad memory for the processing circuitry 710.

In one configuration, software for implementing one or more embodiments disclosed herein is stored in the storage 730, in the memory 720, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 710, cause the processing circuitry 710 to perform the various processes described herein, in accordance with an embodiment.

In some embodiments, the storage 730 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 740 is configured to provide the topology generator 150 with communication with, for example, an observability system 140, a ticketing system 130, a cybersecurity monitoring system 120, a computing environment 110, a combination thereof, and the like, according to an embodiment.

It should be understood that the embodiments described herein are not limited to the specific architecture illustrated in FIG. 7, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for generating a unified network topology for a computing environment, comprising:

receiving a plurality of event records, each event record generated based on an event in the computing environment;

extracting from each event record of the plurality of event records network topology information;

detecting in the extracted network topology information a parent resource and a child resource;

generating a representation of the parent resource in a unified network topology;

generating a representation of the child resource in the unified network topology; and connecting the representation of the parent resource to the representation of the child resource, wherein the connection represents the extracted topology information.

2. The method of claim 1, further comprising:

extracting topology information including any one of: an identifier of a resource, a relationship between a first resource and a second resource, geographical information, spatial information, and any combination thereof.

3. The method of claim 1, further comprising:

determining that a first event record of the plurality of event records is received from a first source having a first schema; and parsing the first event record based on the first schema.

4. The method of claim 3, further comprising:

determining that a second event record of the plurality of event records is received from a second source having a second schema; and parsing the second event record based on the second schema, wherein the second schema is different from the first schema.

5. The method of claim 4, further comprising:

mapping the first schema to a data schema of the unified network topology; and mapping the second schema to the data schema of the unified network topology.

6. The method of claim 1, further comprising:

evicting a representation of a resource from the unified network topology in response to determining that no event was received respective of the resource for a predetermined amount of time.

7. The method of claim 6, further comprising:

evicting a representation of another resource in response to determining that the resource is a parent of the another resource.

8. The method of claim 1, further comprising:

storing the unified network topology in any one of: a table database, a graph database, and a combination thereof.

9. The method of claim 1, further comprising:

detecting in the extracted topology information an identifier of a principal associated with the parent resource; and storing the identifier of the principal with the representation of the parent resource.

10. The method of claim 9, further comprising:

associating the representation of the parent resource and the representation of the child resource with the identifier of the principal.

11. A non-transitory computer-readable medium storing a set of instructions for generating a unified network topology for a computing environment, the set of instructions comprising:

one or more instructions that, when executed by one or more processors of a device, cause the device to:

receive a plurality of event records, each event record generated based on an event in the computing environment;

extract from each event record of the plurality of event records network topology information;

detect in the extracted network topology information a parent resource and a child resource;

generate a representation of the parent resource in a unified network topology;

generate a representation of the child resource in the unified network topology; and connect the representation of the parent resource to the representation of the child resource, wherein the connection represents the extracted topology information.

12. A system for generating a unified network topology for a computing environment comprising:

a processing circuitry;

a memory, the memory containing instructions that, when executed by the processing circuitry, configure the system to:

receive a plurality of event records, each event record generated based on an event in the computing environment;

extract from each event record of the plurality of event records network topology information;

detect in the extracted network topology information a parent resource and a child resource;

generate a representation of the parent resource in a unified network topology;

generate a representation of the child resource in the unified network topology; and connect the representation of the parent resource to the representation of the child resource, wherein the connection represents the extracted topology information.

13. The system of claim 12, wherein the memory contains further instructions which when executed by the processing circuitry further configure the system to:

extract topology information including any one of:

an identifier of a resource, a relationship between a first resource and a second resource, geographical information, spatial information, and any combination thereof.

14. The system of claim 12, wherein the memory contains further instructions which when executed by the processing circuitry further configure the system to:

determine that a first event record of the plurality of event records is received from a first source having a first schema; and parse the first event record based on the first schema.

15. The system of claim 14, wherein the memory contains further instructions which when executed by the processing circuitry further configure the system to:

determine that a second event record of the plurality of event records is received from a second source having a second schema; and parse the second event record based on the second schema, wherein the second schema is different from the first schema.

16. The system of claim 15, wherein the memory contains further instructions which when executed by the processing circuitry further configure the system to:

map the first schema to a data schema of the unified network topology; and map the second schema to the data schema of the unified network topology.

17. The system of claim 12, wherein the memory contains further instructions which when executed by the processing circuitry further configure the system to:

evict a representation of a resource from the unified network topology in response to determining that no event was received respective of the resource for a predetermined amount of time.

18. The system of claim 17, wherein the memory contains further instructions which when executed by the processing circuitry further configure the system to:

evict a representation of another resource in response to determining that the resource is a parent of the another resource.

19. The system of claim 12, wherein the memory contains further instructions which when executed by the processing circuitry further configure the system to:

store the unified network topology in any one of:

a table database, a graph database, and a combination thereof.

20. The system of claim 12, wherein the memory contains further instructions which when executed by the processing circuitry further configure the system to:

detect in the extracted topology information an identifier of a principal associated with the parent resource; and store the identifier of the principal with the representation of the parent resource.

21. The system of claim 20, wherein the memory contains further instructions which when executed by the processing circuitry further configure the system to:

associate the representation of the parent resource and the representation of the child resource with the identifier of the principal.

* * * * *